April 9, 1946.  F. P. GERHARDT  2,398,221
POWER UNIT
Filed Dec. 12, 1940  3 Sheets-Sheet 1

INVENTOR.
Fred P. Gerhardt
BY
Atty.

April 9, 1946.   F. P. GERHARDT   2,398,221
POWER UNIT
Filed Dec. 12, 1940   3 Sheets-Sheet 2

INVENTOR.
Fred P. Gerhardt
BY
*Philip E. Liggus*
ATTORNEY.

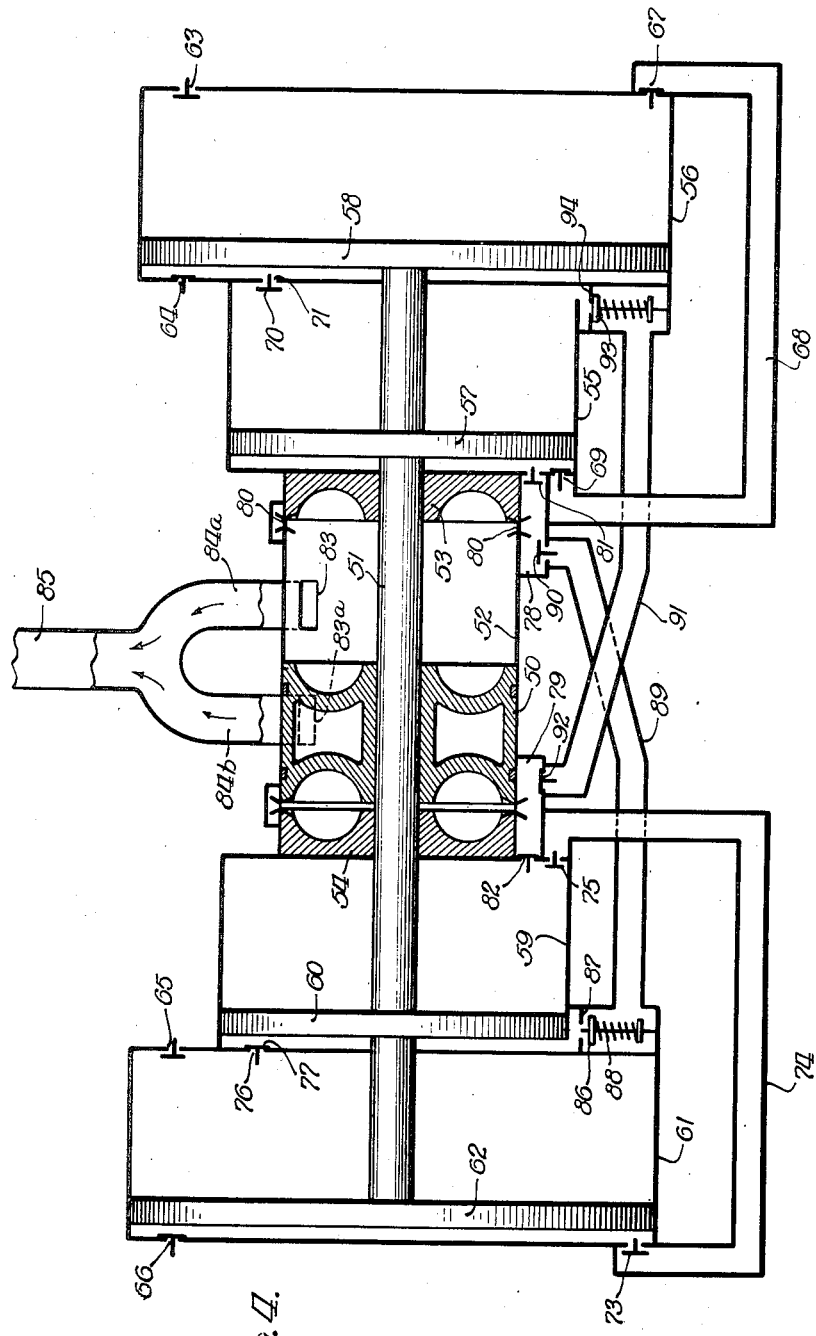

Patented Apr. 9, 1946

2,398,221

UNITED STATES PATENT OFFICE 2,398,221

POWER UNIT

Fred P. Gerhardt, Milwaukee, Wis., assignor, by direct and mesne assignments, of thirty-nine per cent to Bertha Gerhardt and 10 per cent to Earl A. Everett, both of Los Angeles County, Calif.

Application December 12, 1940, Serial No. 369,759

2 Claims. (Cl. 123—46)

This invention relates to prime movers or power units and the general object of the invention is to provide a power unit driven by internal combustion which will have a greatly increased efficiency as compared with the most efficient internal combustion engines known today. I also aim to conserve a large proportion of the heat (B. t. u.'s) ordinarily lost by radiation or in the cooling system or in the exhaust, and to convert this heat into power. The invention further provides a power unit of enhanced efficiency which may burn gasoline, kerosene, fuel oil or powdered coal and which may be used as a marine engine, an automotive power plant or an airplane engine, and indeed, wherever an internal combustion engine finds a field of usefulness. Other objects will appear from the following description of several embodiments of the invention.

In the accompanying diagrammatic drawings:

Fig. 4 is a longitudinal section showing another form of engine employing two stage air compression;

Figure 1:
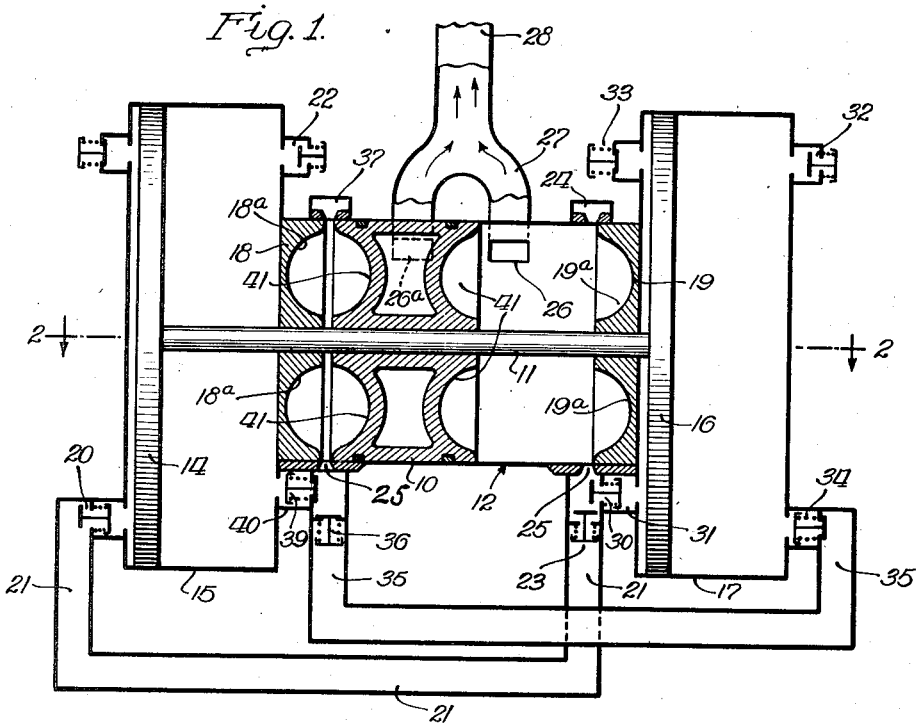
Fig. 1 is a longitudinal sectional view of a simple type of engine.
Figure 2:
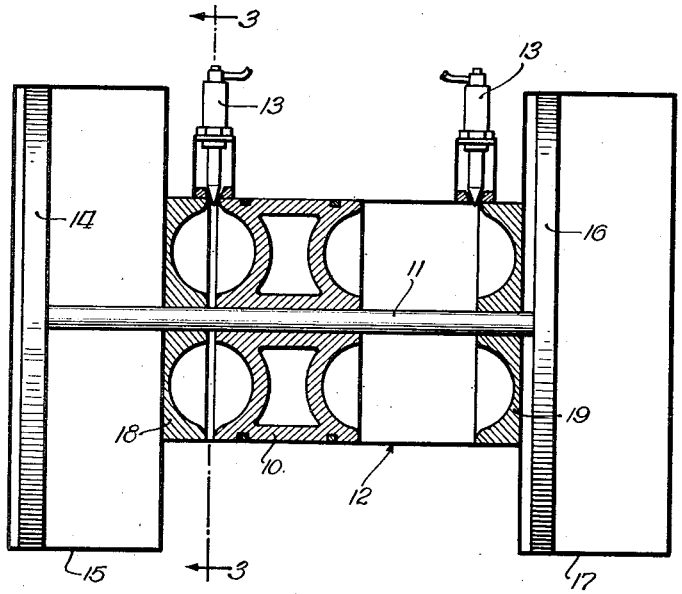
Fig. 2 is a longitudinal section on line 2—2 of Fig. 1.
Figure 3:
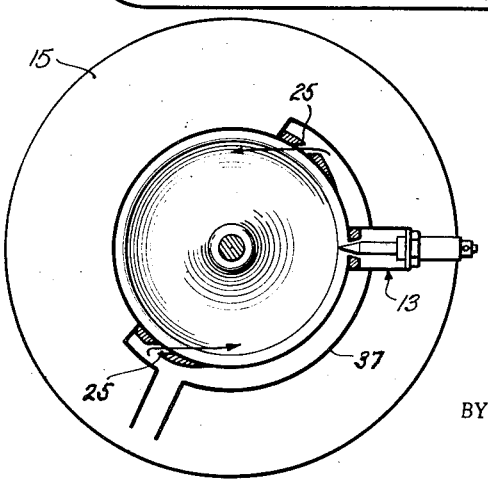
Fig. 3 is a cross section on line 3—3 of Fig. 2.

Referring particularly to the drawings, and first to Figs. 1, 2 and 3, an internal combustion engine is there shown comprising a piston 10 fast to a piston rod 11 and adapted to reciprocate in a "truncated" cylinder 12 responsive to explosions alternately at opposite ends of the cylinder. While these explosions may take place because of a spark igniting an explosive charge delivered by a carburetor, as in any automobile engine, I prefer to use a liquid fuel injector 13 at either end of cylinder 12, said injector being of a type known in the art of Diesel engines. The mechanism by which a measured amount of fuel is delivered at the proper instant to each injector 13 is not shown because it may be one of several types and it forms no part of the present invention. At one end of piston rod 11 is a compressor piston 14 reciprocable in an air compressor cylinder 15, and at the other end of the piston rod is another compressor piston 16 reciprocable in a compression cylinder 17, compression cylinders 15, 17 being axially alined with power cylinder 12. Both compression cylinders 15, 17 are of the same size and both are shown as being larger in diameter than the power cylinder 12, from which they are sealed off by the cylinder heads 18, 19 respectively; but the compression cylinders may each be smaller than the power cylinder.

Figure 5:
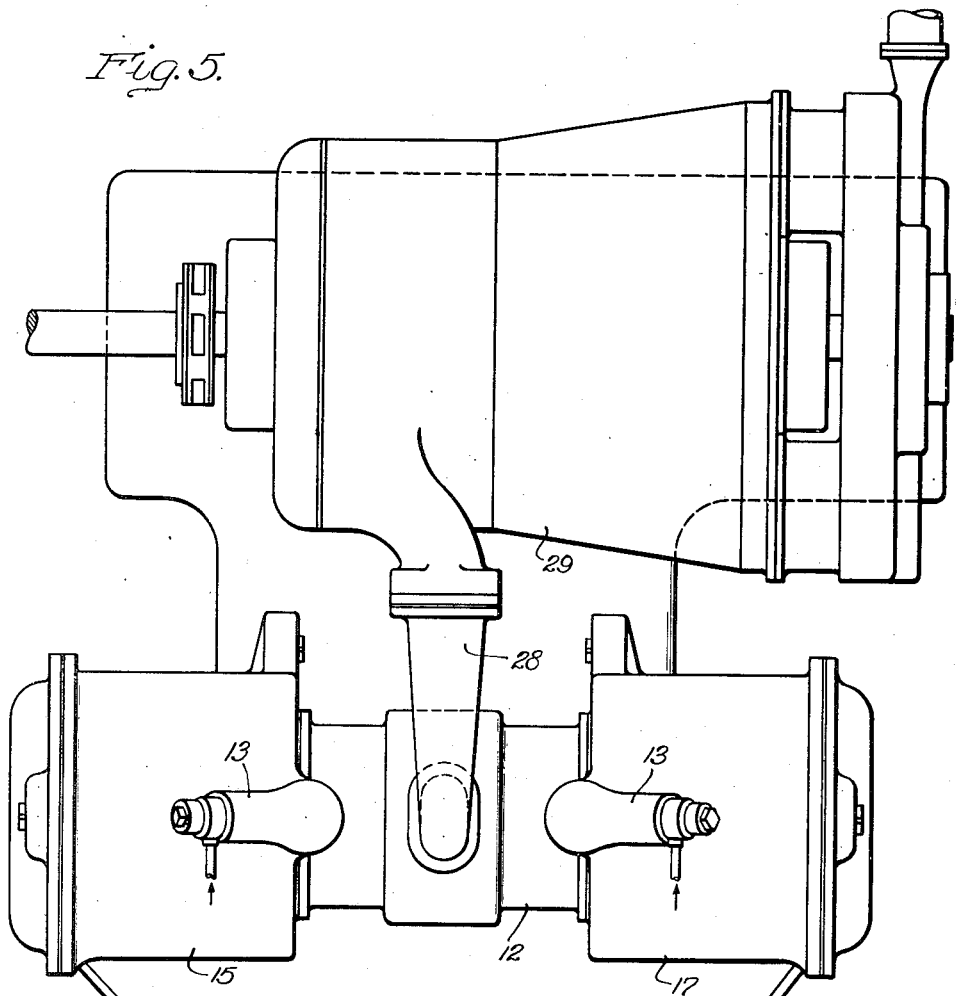
Fig. 5 is an elevation showing still another form of engine much like the engine of Figs. 1 and 2 but assembled with an exhaust-driven turbine and being equipped with a starter.

When the parts are in the position of Figs. 1 and 2, piston 10 has compressed a charge of air in the left end of cylinder 12, and the injector 13 at that end will inject fuel, causing an explosion to take place spontaneously in the left end of the cylinder. As viewed in Fig. 1, compressor piston 14 has fully compressed air previously admitted from the atmosphere into cylinder 15, and the compressed air is escaping past exhaust valve 20 into a pipe 21 which leads to the right end of cylinder 12. At the same instant, a fresh charge of air enters cylinder 15 past inlet valve 22. Pipe 21 has a check valve 23 near its discharge end, where it is connected with a semi-circular intake manifold 24 on the outside of cylinder 12, see Fig. 3. There are two pairs of nozzles 25 at opposite ends of the power cylinder, the nozzles of each pair being at preferably diametrically opposite points on the power cylinder, discharging the highly compressed air into the adjacent end of said cylinder. Nozzles 25 considerably increase the velocity of the compressed air. This compressed air of course scavenges the right end of the power cylinder, the hot gases, with some of the scavenging air, being exhausted through a port 26 in the side of the cylinder, said port 26 leading to a branch 27 of an exhaust manifold 28 which may lead to a turbine 29, as in the arrangement of Fig. 5, or to some other type of engine or prime mover. Said compressed air, whirling at great speed within the right end of the cylinder, because of the disposition of the nozzles 25, though hot from the compression has a considerably lower temperature than the cylinder and cylinder head 19 and hence soaks up excess heat from the same, this being the second function of the compressed air charge. The part of the compressed air which remains in the cylinder 12 (right hand end) forms a fresh explosive charge when fuel is later injected in said end from injector 13. This is the third function performed by the compressed air.

Now assuming that the explosion has taken place in the left end of the cylinder, piston 10 is moved to the right and when it passes outlet or port 26a (corresponding to port 26) it starts to compress further the compressed air charge in the right end of the cylinder. Check valve 23 immediately closes, as does check valve 30 in inlet 31 leading from compression cylinder 17. Compression piston 16 in cylinder 17 starts moving to the right, causing inlet valve 32 to close and inlet valve 33 to open. Air in front of the moving face of piston 16 is of course compressed, there being, for the moment, no outlet for the same. But when piston 10 exposes the port 26a, which acts like a valve, valve 34, which had previously been held closed by its spring, opens to discharge compressed air through pipe 35, past check valve 36, through intake manifold 37, through nozzles 25 into the left end of cylinder 12. Thus the opening of port 26a leading to the discharge manifold 28 effects opening of valve 34, allowing a fresh charge of compressed air to enter the left end of cylinder 12 to perform the three functions already mentioned in describing the action at the right end of the cylinder 12. Opening of port 26 likewise controls opening of valve 20 controlling discharge of compressed air from compression cylinder 15.

Again assuming that the charge in the left end of cylinder 12 has just been fired, as piston 10 moves to the right to cause compressor piston 16 to compress air in cylinder 17, as just described, compressor piston 14 simultaneously starts moving to the right to compress air in the right end of compression cylinder 15. Compression in cylinder 15 takes place because inlet valve 22 immediately closes, and valve 39 (in inlet pipe 40, connected with intake manifold 37) remains closed because of its spring. However, when piston 10 exposes port 26a in its movement to the right, valve 39 opens, permitting the air compressed by piston 14 to be discharged through inlet pipe 40 to the left end of power cylinder 12, and said charge of compressed air mingles with the charge of compressed air from pipe 35, the two charges whirling around inside the left end of cylinder 12 and scavenging and cooling the same and preparing it for the next explosion. Valve 30 corresponds to valve 39, permitting compressed air from cylinder 17 to pass through pipe 31 into the right end of power cylinder 12 at the same time compressed air from the left end of cylinder 15 passes through pipe 21 into the same end of the power cylinder.

From the foregoing, it will be clear that each compressor piston 14, 16 compresses air in each stroke. Compressed air from both cylinders 15, 17 is delivered at the same time to either end of power cylinder 12; and the combined charge of compressed air, after scavenging and cooling as described above, remains in sufficient volume and under sufficient pressure to insure high pressures in power cylinder 12 such as will spontaneously ignite the fuel charge, as in any Diesel engine. It will likewise be clear that the compressed air charge is further compressed by the power piston 10, generating heat which is dissipated partly by radiation from the walls of cylinder 12 but which is largely absorbed by the scavenging blast of the subsequent compressed air charge.

It will be particularly noted that the piston 10 has a cavity 41 on each end, said cavity being annular, and cylinder heads 18, 19, likewise have annular cavities 18a, 19a respectively. Cavity 18a is complemental to cavity 41 on that side of the piston and cavity 19a is complemental to cavity 41 on the corresponding piston end. Thus there is an unusually large clearance space at each end of the cylinder, at the moment of greatest compression (which is the moment of firing—Fig. 1). This clearance space, forming alternately at opposite ends of the firing or power-generating cylinder, may be said to be doughnut-shaped, and is of great importance to insure a whirling motion of the charges of compressed air for the scavenging and cooling mentioned above. Also these doughnut-shaped clearance spaces insure a sufficient volume of highly compressed air and gases of combustion to effect the delivery of power-generating gases through the exhaust manifold 28. It is one of the aims of the invention not to use up the heat and power of the fuel and compressed air in the described engine, but to deliver heat and power through the exhaust manifold to any engine or turbine. Indeed, the described power unit is not primarily an engine, but rather a generator, since it generates vast quantities of heated gases which are themselves conducted to a true engine or motor to accomplish useful work. A turbine 42, as in Fig. 5, if direct-connected to a generator like that of Fig. 1, will be driven at high speed by the gases delivered from said generator, and will have a long life because its blades cannot be injured by highly heated gases, since the gases in the generator by doing useful work have had much of their heat abstracted; and furthermore the compressed air dilutes and moderates the gases of combustion and hence prevents any damage to the turbine blades.

Another highly valuable feature of the generator of Figs. 1 and 2 is the fact that the compressed air charges strike the power piston and the interior of the combustion chamber once during each cycle. This direct contact of cooling gases with the interior of the power cylinder assures cooling of the hottest parts of the cylinder 12 and piston 10 without depending on radiation through the walls of the power cylinder. Thus no external cooling system need be used, and the unit may be operated at exceedingly high speeds. Furthermore, since an external cooling system is not needed, and the power piston and cylinder are cooled uniformly thus avoiding internal stresses in the metal, the power unit may be built much larger than is feasible with engines having external cooling systems.

It will be observed that piston 10 is a "free-floating" piston, that is, there is no crank and crankshaft, or other mechanical means to limit its stroke in either direction; hence its speed is not limited by mechanical connections and shaft load conditions. As piston 10 approaches either end of cylinder 12, a cushion of compressed air tends to check it, and this checking or elastic cushioning is supplemented by the cushions of compressed air in cylinders 15 and 17. Furthermore, the fuel charge is injected before the piston can strike the end of cylinder 12, causing an explosion which reverses the movement of the piston. Thus no springs or checks or other mechanical connections for safety or control are necessary, in the simple form of the invention now under consideration.

It will be clear from the drawings that the described power unit is perfectly balanced and that it will operate at high speed free of vibration, when two units are set in line and synchronized in revolutions so that the thrust from one counteracts the thrust of the other. Unlike a Diesel engine which requires a heavy base due to the severe thrust on the crankshaft bearings, the weight of my power unit may be low, and its cost may be low because the parts are few.

Another important feature of the invention (which will be apparent after studying Fig. 1) is the fact that when one port 26, 26a is closed by piston 10, the other port 26a, 26 is open or partly open, thus insuring a constant pressure and absolutely continuous flow of hot gases from the generator to the turbine, thereby eliminating losses due to changing pressure ratios.

Now referring to Fig. 4, a piston 50 is there shown on a piston rod 51 extending centrally of a power cylinder 52. Except for an increased length of piston rod 51, the parts 50, 51 and 52 are exactly like the piston, piston rod and power cylinder of Figs. 1 and 2. Power cylinder 52 has cylinder heads 53, 54 at opposite ends, and the piston rod 51 extends through both cylinder heads, which form bearings for the reciprocating piston rod. Axially alined with power cylinder 52 at one end are two compression cylinders 55, 56, cylinder 56 being the larger, and being at the extreme end of the power unit. A compressor piston 57 is rigidly secured to piston rod 51 to operate in compression cylinder 55, and a compression piston 58 operates in cylinder 56. At the other end of the power unit a compression cylinder 59 is secured, and a compressor piston 60, fast to piston rod 51, works in cylinder 59. Axially alined with cylinder 59 is a larger compression cylinder 61 in which a piston 62, fast to piston rod 51, reciprocates. The two large compression cylinders 56, 61 at the opposite ends of the power unit are each provided with inlet valves 63, 64, 65, 66 which on each stroke of the pistons 58, 62 open to admit atmospheric air to one side of said pistons and close to prevent escape of compressed air. The action of valves 63, 64, 65, 66 is exactly like the action of the inlet valves 32, 33, 22, 36 of Fig. 1. Each stroke of piston rod 51 causes air to be compressed by pistons 58, 62 in the respective cylinders 56, 61, and this compressed air is conducted away as will now be described.

The relatively large volume of compressed air from cylinder 56 is forced past a check valve 67, when the stroke is from left to right as the parts are viewed in Fig. 4, said check valve being of course closed by a spring, not shown, the action being the same as that of spring pressed valve 34, Fig. 1. Valve 67 controls movement of compressed air through a pipe 68, and said pipe leads to compression cylinder 55. A check valve 69 is at the discharge end of pipe 68 and it opens when valve 67 opens, to permit flow of compressed air from cylinder 56 (the low stage cylinder) to cylinder 55 (the high stage cylinder). Compressed air from pipe 68 obviously provides a charge for piston 57 which is compressed further when piston 57 moves from right to left, which will be on its next stroke. Thus air compressed by piston 58 on its left to right stroke is admitted to the left side of piston 57 to be further compressed. Air compressed by piston 58 on its right to left stroke lifts a spring pressed check valve 70 controlling a port 71 between cylinders 56 and 55, and passes directly into cylinder 55 to be compressed further during the left to right stroke of piston 57.

Exactly the same construction is at the other end of the power unit. A spring pressed check valve 73 admits compressed air discharged from compression cylinder 61 to a pipe or conduit 74 leading to compression cylinder 59, and a spring pressed check valve 75 is at one end of cylinder 59 to admit said compressed air when check valve 73 lifts. A port 76 between cylinders 59 and 61 has a spring pressed check valve 77 and permits compressed air from cylinder 61 to flow directly into cylinder 59, when pistons 60, 62, are moving to the right. Thus the left stroke of piston 62 causes compressed air to enter the right end of cylinder 59, and the right stroke of piston 62 causes compressed air to enter the left end of cylinder 59. In either case, the compressed air discharged from cylinder 61 is further compressed by piston 60.

Air under high pressure from cylinders 55, 59 is conducted to the opposite ends of power cylinder 52 during each stroke of piston 50, thereby to scavenge the power cylinder, to cool it and to admit a charge of compressed air which will form an explosive mixture when the fuel is injected (as already described in connection with Figs. 1 and 2). At each end of the power cylinder a semi-annular intake manifold 78, 79 is arranged, with venturis 80 preferably at diametrically opposite points, the venturis 80 being preferably like venturis 25. The intake manifolds 78, 79 may extend to the inner or adjacent ends of the high compression cylinders 55, 59 respectively and check valves 81, 82 may control flow of highly compressed air from cylinders 55, 59 into said intake manifolds. With the parts in the positions shown in Fig. 4, highly compressed air is discharged from cylinder 55 past the venturi 80 into power cylinder 52; and said air scavenges the power cylinder, absorbs much of its heat, and mixed with the products of combustion part of said air passes out through port 83 leading to branch 84a of the exhaust manifold 85. A similar port 83a is on the other side of the power cylinder and it is connected with branch 84b of manifold 85. Exhaust manifold 85 is also an intake or pressure pipe leading to a turbine (as in Fig. 5) or to an expansion engine (not shown) or to a system of expansion nozzles (not shown) providing jet propulsion.

At the same instant that highly compressed air is discharged into the right end of the power cylinder from high compression cylinder 55, an equal charge of compressed air under like high pressure is discharged into the same end of the power cylinder from high compression cylinder 59. A check valve 86 is located at the left end of cylinder 59 and is lifted off its seat 87 by the excessively high pressure of air compressed by the right to left stroke of piston 60, but is otherwise held on its seat by spring 88. Compressed air forced past valve 86 flows through a pipe or conduit 89 the discharge end of which terminates in intake manifold 78, and a check valve 90 is at said discharge end. Thus the right to left strokes of the high pressure pistons 57, 60 cause a double charge of highly compressed air to flow into intake manifold 78, thence to the power cylinder. Another pipe 91 discharges highly compressed air from cylinder 55 past check valve 92 to intake manifold 79 and thence to the left side of the power cylinder; and a check valve 93, held on seat 94 by its spring, controls flow through pipe 91.

The form of Fig. 4, it will now be clear, is substantially the same as that of Fig. 1 except for the employment of two two-stage air compressors in lieu of two one-stage compressors. A great many additional changes and modifications may be made, within the scope of the invention. Therefore the present invention is not to be considered as limited to the forms described and shown, but is defined by the appended claims.

Having described the invention, what I claim as new and desire to secure by Letters Patent is:

1. A power unit comprising, in combination, a power cylinder; a piston and piston rod reciprocable in the power cylinder; means feeding fuel to the opposite ends of the cylinder; a pair of compressor pistons secured to the opposite ends of said piston rod; the diameter of said compressor pistons being larger than the diameter of the power piston; compression cylinders in which said compressor pistons reciprocate; conduits or pipes leading from each end of each compression cylinder to both ends of the power cylinder; inlet valves for each end of each compression cylinder; check valves to control flow of air through said conduits or pipes; an exhaust manifold having two branches; and ports formed in the wall of the power cylinder and discharging into the branches of the exhaust manifold; the ports being so constructed and arranged that said ports are always partly uncovered by the piston in the power cylinder or else one of the ports is completely uncovered.

2. The invention according to claim 1 wherein there are two pairs of compressor pistons secured to the piston rod, two of the compressor pistons being at the opposite ends of the piston rod and the other two compressor pistons being secured to the piston rod at intermediate points; each of said compressor pistons reciprocating with the power piston but in a compression cylinder, there being two adjacent axially alined compression cylinders at each end of the power cylinder and being alined therewith; the compression cylinders at the extreme ends of the power unit being larger in diameter than the intermediate compression cylinders; and means to conduct compressed air from each of the large compression cylinders to the adjacent smaller compression cylinder to be further compressed.

FRED P. GERHARDT.